United States Patent
Poon et al.

(10) Patent No.: US 9,889,391 B2
(45) Date of Patent: Feb. 13, 2018

(54) DEGASSER AND METHOD OF STRIPPING GAS FROM A LIQUID

(71) Applicant: Veolia Water Solutions & Technologies Support, Saint-Maurice (FR)

(72) Inventors: Aaron Poon, Downey, CA (US); David Salyer, Corona, CA (US); Oscar Velastegui, Corona, CA (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 407 days.

(21) Appl. No.: 14/667,973

(22) Filed: Mar. 25, 2015

(65) Prior Publication Data
US 2016/0279537 A1    Sep. 29, 2016

(51) Int. Cl.
*B01D 19/00*    (2006.01)
*B01D 19/02*    (2006.01)
*C02F 1/20*    (2006.01)

(52) U.S. Cl.
CPC ....... *B01D 19/0005* (2013.01); *B01D 19/001* (2013.01); *B01D 19/0042* (2013.01); *B01D 19/0047* (2013.01); *B01D 19/0052* (2013.01); *B01D 19/02* (2013.01); *C02F 1/20* (2013.01)

(58) Field of Classification Search
CPC ............ B01D 19/0005; B01D 19/0052; B01D 19/0047; B01D 19/001; B01D 19/0042; B01D 19/02; C02F 1/20
See application file for complete search history.

(56) References Cited

U.S. PATENT DOCUMENTS

| | | | | |
|---|---|---|---|---|
| 2,419,245 A | * | 4/1947 | Arveson .................... | B01J 8/26 34/588 |
| 2,720,280 A | * | 10/1955 | Doyle .................. | B01D 47/021 261/119.1 |
| 4,370,151 A | * | 1/1983 | Herbrechtsmeier | B01D 19/0015 210/220 |
| 4,564,457 A | * | 1/1986 | Cairo, Jr. ........... | B01D 17/0205 209/170 |
| 4,668,250 A | | 5/1987 | Drese | |
| 4,752,306 A | | 6/1988 | Henriksen | |
| 4,931,225 A | * | 6/1990 | Cheng ................ | B01D 19/0005 261/76 |
| 5,158,678 A | * | 10/1992 | Broussard, Sr. ... | B01D 17/0205 209/170 |
| 5,190,665 A | | 3/1993 | Titmas et al. | |
| 5,277,803 A | * | 1/1994 | Broussard, Sr. ... | B01D 17/0205 209/170 |

(Continued)

Primary Examiner — Amber R Orlando
Assistant Examiner — Britanny Precht
(74) Attorney, Agent, or Firm — Coats & Bennett, PLLC

(57) ABSTRACT

A degasser includes a vessel having a series of chambers. Liquid containing a gas is directed through the vessel and the chambers therein. A stripping gas is injected into the vessel and moves through the vessel in a counter-current direction relative to the flow of liquid. More particularly, the stripping gas moves from one chamber to another chamber in an upstream direction (relative to the flow of the liquid) and is mixed with the liquid in each chamber, causing gas in the liquid to be displaced. Displaced gas is vented from the vessel at a location near where the liquid enters the vessel.

6 Claims, 4 Drawing Sheets

(56) References Cited

U.S. PATENT DOCUMENTS

| | | | | |
|---|---|---|---|---|
| 5,376,266 A | * | 12/1994 | Broussard | B01D 17/0205 210/195.1 |
| 6,840,983 B2 | * | 1/2005 | McNulty | B01D 19/0005 95/263 |
| 2005/0056431 A1 | * | 3/2005 | Harrington | B09C 1/002 166/372 |
| 2010/0300296 A1 | | 12/2010 | Venturelli | |

\* cited by examiner

DEGASSER AND METHOD OF STRIPPING GAS FROM A LIQUID

FIELD OF THE INVENTION

The present invention relates to degassers employed to strip gases, such as oxygen, carbon dioxide, benzene and hydrogen sulfide, from a liquid.

BACKGROUND OF THE INVENTION

Gas stripping is a process where a particular gas is removed from a liquid. Specifically, gas stripping involves the mass transfer of a gas from a liquid phase to a gas phase. The transfer is accomplished by contacting the liquid containing the gas that is to be stripped with a different stripping gas. Various systems and processes have been used to strip dissolved gases such as ammonia ($NH_3$), carbon dioxide ($CO_2$), oxygen ($O_2$), hydrogen sulfide ($H_2S$), and variety of volatile organic compounds (VOCs) from a liquid. For example, conventional systems for stripping gas from a liquid include packed beds, columns and vacuum degassers. However, these conventional systems are not generally suited for removing gas from oily or dirty liquids such as, for example, produced water resulting from oil and gas recovery processes.

Therefore, there has been and continues to be a need for an efficient degasser that is suited for removing gas from liquid waste streams that are dirty or contain oil.

SUMMARY OF THE INVENTION

The present invention comprises a system and process for removing dissolved gas from a liquid stream flowing through a vessel having a plurality of chambers. A stripping gas is injected into the vessel and moves through the vessel and the chambers therein in a counter-current direction relative to the flow of the liquid. The stripping gas is mixed with the liquid, causing the dissolved gas in the liquid to be displaced. Thus, as the liquid moves from a liquid inlet through the vessel and from chamber-to-chamber towards a liquid outlet, the concentration of the dissolved gas in the liquid is reduced while the concentration of the stripping gas in the liquid increases.

In one embodiment, the liquid and stripping gas are directed into opposite ends of the vessel and move through the vessel in counter-current directions. The stripping gas is mixed with the liquid and this causes an undesirable gas in the liquid, such as carbon dioxide, to be displaced and is replaced by a portion of the stripping gas. The displaced gas and the residual stripping gas move upwardly through the liquid in respective chambers to an overlying vapor space where the displaced gas and the residual stripping gas form a gas mixture. This gas mixture is induced to move upstream relative to the flow of the liquid and to be repeatedly mixed with the liquid, causing additional gas to be displaced from the liquid. Near the inlet end of the vessel there is provided an exhaust port or gas outlet through which the displaced or undesirable gas is exhausted from the vessel.

Other objects and advantages of the present invention will become apparent and obvious from a study of the following description and the accompanying drawings which are merely illustrative of such invention.

DESCRIPTION OF EXEMPLARY EMBODIMENTS

Figure 1:
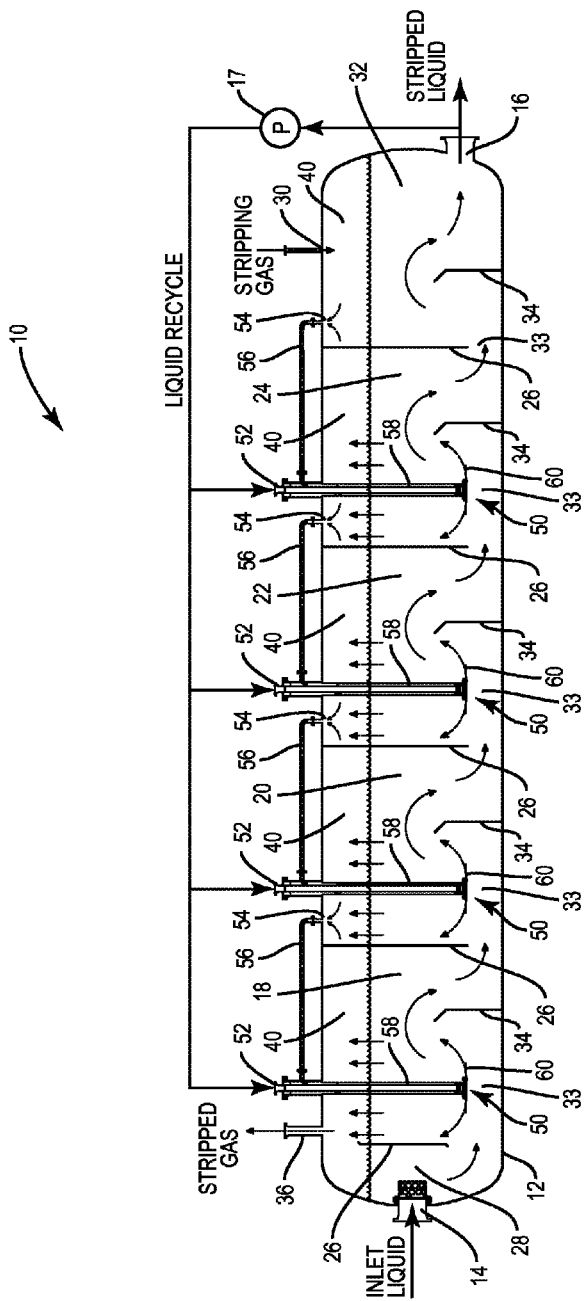
FIG. 1 is a view of the degasser of the present invention.

With further reference to the drawings, the degasser of the present invention is shown therein and indicated generally by the numeral 10. As will be appreciated from subsequent portions of the disclosure, degasser 10 is configured to receive a liquid and to remove or strip undesirable gases, such as carbon dioxide, oxygen, hydrogen sulfide and benzene, from the liquid. Liquid enters the degasser 10 and, as viewed in FIG. 1, moves left to right through the degasser. A stripping gas (sometimes referred to as a secondary gas) is injected into the degasser 10 and moves generally in a counter-current direction relative to the flow of liquid. Thus, as viewed in FIG. 1, the stripping gas moves generally right to left and in the process contacts and is mixed with the liquid. The stripping gas, such as nitrogen or fuel gas for example, is mixed with the liquid, causing the undesirable gas in the liquid to be displaced and replaced with the stripping gas. Mixing the stripping gas with the liquid occurs at multiple locations in the degasser 10. This results in the concentration of the undesirable gas in the liquid progressively decreasing as the liquid flows through the degasser 10.

Turning to a more detailed discussion of the degasser 10, the degasser comprises a vessel 12 that receives the liquid stripping gas. Vessel 12 can assume various shapes and sizes. The vessel 12 is a closed or pressurized system and is not designed to be open to the atmosphere. Generally, the vessel 12 is maintained near atmospheric pressure, in the range of 3-6 kpag. In one embodiment, the vessel 12 comprises an elongated tank. Vessel 12 includes a liquid inlet 14 and a liquid outlet 16. As seen in the drawings, the liquid inlet 14 and the liquid outlet 16 are located on opposite ends of the vessel 12. Formed in the vessel 12 is a series of chambers where degasification occurs. The number of chambers can vary. In the embodiment illustrated herein, the vessel 12 includes four chambers, 18, 20, 22 and 24. These chambers are formed by a series of partitions 26 that are spaced apart in the vessel 12. Note that each partition 26 is spaced from the bottom of the vessel 12 and except for the partition 26 adjacent inlet 14, the remaining partitions extend upwardly to the top of the vessel 12. Note that openings 33 are formed between the bottom of the vessel 12 and the lower terminal edges of the partitions 26. It follows that the liquid flowing through the vessel will flow underneath the respective partitions 26 and through the openings 33 as the liquid flows from the inlet 14 to and through the outlet 16.

Formed adjacent the inlet 14 and prior to the first partition 26 is an inlet area 28. Thus, it is appreciated that liquid entering the inlet 14 will pass through the inlet area 28 prior to reaching the first chamber 18. Downstream from the inlet area 28 and past the last chamber 24 is a stripping gas inlet 30 where stripping gas is injected into the vessel 12. Below the stripping gas inlet 30 in this embodiment is a discharge chamber 32. It follows that the liquid being degassed passes through the discharge chamber 32 prior to being discharged from the outlet 16.

To generally aid in directing the flow of liquid through the vessel, there is provided a series of baffles 34 that are strategically placed in the bottom portion of the vessel 12. As seen in the drawings, these baffles 34 are spaced between the partitions 26 and extend upwardly from the bottom of the vessel 12. In the embodiment illustrated herein, the baffles 14 include an angled upper terminal edge that extends slightly above the lower terminal edges of the partitions 26. Thus, as the liquid flows through the vessel 12, the liquid is constrained to move under the lower terminal edges of the partitions 26 and over the baffles 34. Baffles 34 tend to turn and direct the flow of liquid upwardly into the lower portions of the chambers 18, 20, 22 and 24. Baffles 34 generally aid flow path distribution and generally prevent or reduce short circuiting of the flow in the chambers and this generally results in the utilization of the full residency time. Baffles 34 also prevent or reduce gas blow-by into adjacent chambers. By placing the baffles 34 at a sufficient height, gas is prevented from being transferred to the downstream chamber which may contaminate the liquid in the downstream cell. It should also be pointed out that the openings 33 formed below the partitions 26 and between respective baffles 34 are designed to allow the liquid—and not the gas—to flow through the openings and from one chamber to another.

Located in the liquid inlet portion of the vessel 12 is a gas outlet 36. As seen in the drawings, the gas outlet 36 is disposed in the top of the vessel 12 adjacent the inlet area 28 and the first or initial chamber 18. Gas expelled via the gas outlet 36 is the displaced gas (sometimes referred to as off-gas) and since the process may not be 100% efficient, the expelled gas might include some stripping gas. Thus, in a typical process, the gas directed out the gas outlet 36 will comprise a gas mixture of displaced gas and stripping gas with the stripping gas typically making up a relatively small portion of the gas mixture expelled from the vessel 12.

Figure 2:
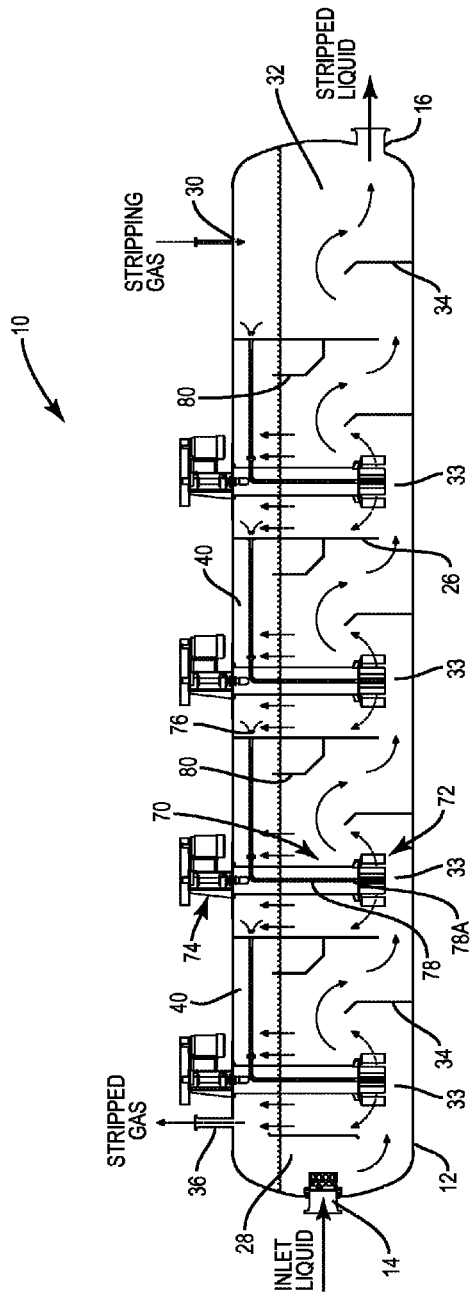
FIG. 2 is a view of an alternative design for the degasser.

Generally the process entails liquid entering the inlet 14 and moving left to right as viewed in FIGS. 1 and 2. At the same time, stripping gas enters the stripping gas inlet 30 and generally flows right to left in a counter-current direction relative to the direction of the flow of liquid. In this process, stripping gas contacts the liquid and is thoroughly mixed with the liquid. Undesirable gases, such as carbon dioxide, oxygen, hydrogen sulfide and benzene, are displaced from the liquid being treated and replaced with the stripping gas. The displaced gas and residual stripping gas move upwardly through the liquid into vapor spaces 40 that are formed between the liquid level and the top of the vessel 12. In order to provide for the vapor spaces 40, the liquid level in the vessel 12 can be controlled by conventional means. That is a control program can be provided to sense the level of the liquid throughout the vessel 12 and to control the level such that an adequate vapor space 40 is provided during the liquid degasification process. Various control systems and programs can be used to control the liquid level in the vessel 12. For example, a level instrument including a transmitter and a level control valve can be employed, or a level instrument with a pump can be used. In these examples, the program effectively reads level signals and, based on the level signals, actuates the level control valve or pump to initiate a change in liquid level.

In the degassing process of the present invention, the stripping gas is induced into the liquid having the gas that is to be stripped or removed. This is achieved by controlling the partial pressure parameters which allows the stripping gas to displace the undesirable gas in the liquid. It should be noted that this is not achieved through a chemical reaction. Henry's Law of Partial Pressure stands for the proposition that at constant temperature, the amount of a given gas that dissolves in a given type and volume of liquid is directly proportional to the partial pressure of that gas in equilibrium with that liquid. In the case of the present process, Henry's Law of Partial Pressure requires that the gas within the liquid be displaced as the stripping gas is introduced.

In many instances, the stripping gas injected into the stripping gas inlet 30 is pure. However, after initially mixing with the liquid, the stripping gas communicated upstream and from chamber-to-chamber may form a part of a gas mixture comprised of both the stripping gas and the displaced gas. Nevertheless, the gas mixed with the liquid is still referred to as stripping gas even though it may form a part of a gas mixture that includes the displaced gas. Thus, as used herein, the term "gas mixture" refers to a mixture of gases that include the stripping gas and at least some displaced gas.

The degasser 10 is provided with a series of mixers for mixing the stripping gas with the liquid in the vessel 12. Various types of mixers can be employed. For example, eductors, rotary mixers, static mixers such as nozzles and spargers, can be employed. The mixers are disposed in the chambers 18, 20, 22 and 24 such that mixing of the stripping gas with the liquid takes place below the surface of the liquid. As described below, the mixers associated with the respective chambers are operative to induce the stripping gas or gas mixture containing the stripping gas into the liquid in a chamber and to thoroughly mix the stripping gas with the liquid.

Figure 1A:
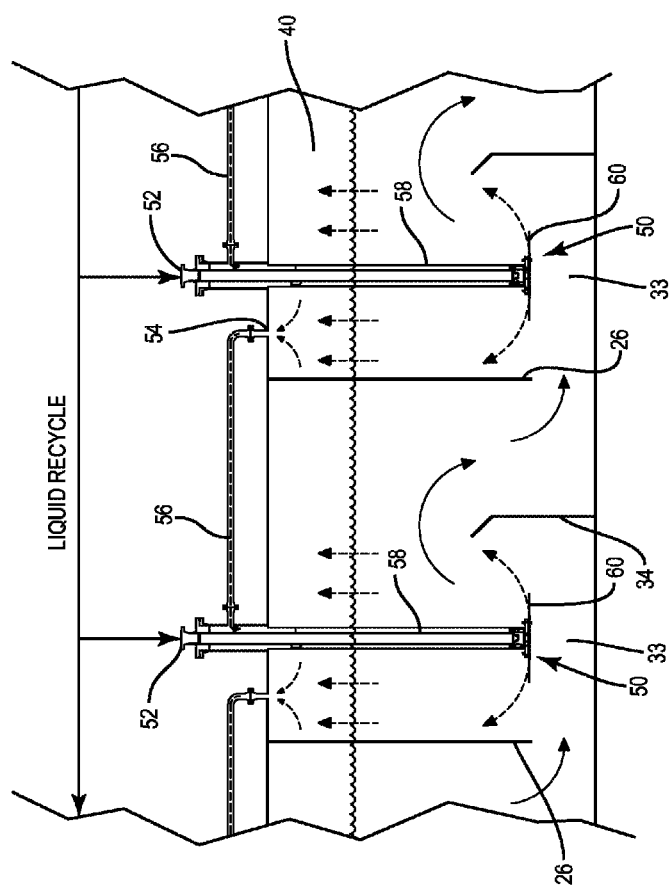
FIG. 1A is an enlarged view of a section of the degasser shown in FIG. 1.

FIGS. 1 and 1A show a series of eductors operatively associated with each of the chambers 18, 20, 22 and 24. Each eductor is generally indicated by the numeral 50. Each eductor 50 includes a motive liquid inlet 52 and a gas inlet 54. In addition, the eductor 50 includes a main conduit 58 that projects downwardly into the liquid. A gas pipe 56 extends from the gas inlet 54 to the main conduit 58. Disposed about the bottom of the eductor as depicted in FIG. 1 is a mixing head that comprises a horizontal plate 60 and one or more nozzles disposed on the lower end of the main conduit 58 and aimed at the plate. A motive liquid is pumped under pressure into motive liquid inlet 52 and directed down the main conduit 58 towards the plate 60. This creates a venturi effect in the area where the gas pipe 56 joins the main conduit 58. This results in a low pressure in the gas pipe 56 that results in the stripping gas or gas mixture being induced into the gas inlet 54 and through the gas pipe 56 and into the main conduit 58 where the stripping gas or gas mixture mixes with the motive liquid. The mixture of motive liquid and stripping gas is directed downwardly towards the outlet end of the main conduit 58. This mixture of motive liquid and stripping gas is discharged from the eductor 50 under pressure. The motive liquid—stripping gas mixture is deflected by the plate 60 and is effective to entrain liquid from the respective chamber and to thoroughly mix the stripping gas with the liquid in the chamber. As discussed above, the mixing of the stripping gas with the liquid in the chamber causes the undesirable gas in the liquid to be displaced and replaced with at least a portion of the stripping gas.

Displaced gas, along with residual stripping gas, moves upwardly through the liquid into the vapor space 40 of the chamber where the eductor 50 is located. "Residual stripping gas" means the remaining portion of the stripping gas in the vessel that is not dissolved in the liquid. As noted above, pure stripping gas may be directed into gas inlet 30 that is located in the discharge chamber 32. As a practical matter, most, if not all, of the stripping gas is contained in the vapor space 40 in the discharge chamber 32. Thus, according to the embodiment illustrated in FIG. 1, essentially pure stripping gas is directed into the last chamber 24 and mixed with the liquid therein. However, the gas that ultimately ends up in the vapor space 40 of the last chamber 24 is generally a mixture of displaced gas and residual stripping gas. It is this gas mixture that is induced into the eductor 50 associated with the adjacent upstream chamber 22. Hence in this case, the motive liquid is operative to mix a mixture of displaced gas and stripping gas with the liquid in chamber 22. This basic process continues upstream from one chamber to an adjacent downstream chamber until the mixture of displaced gas and residual stripping gas reaches the gas outlet 36 where it is expelled from the vessel 12. As discussed above, it follows that the concentration of undesirable gas in the liquid continues to decrease as the liquid moves downstream. Also, the concentration of residual stripping gas continues to decrease as the stripping gas is induced to move upstream from one chamber to another chamber.

Various sources of motive liquid can be used to power the eductors 50. In the embodiment illustrated in FIG. 1, treated effluent from the outlet 16 of the vessel 12 is used as the motive liquid. A pump 17 is operatively connected to the outlet 16 of vessel 12 for pumping treated effluent from the vessel into the eductors 50. Thus, a portion of the treated effluent is recycled through the eductors back into the vessel 12. Thus, a portion of the treated effluent serves as the motive liquid and at the same time portions of the recycled treated effluent is subjected to additional degasification.

In the FIGS. 1 and 1A embodiment, it is noted that the gas pipe 56 extends outside of the vessel 12. It should be noted, however, that in other embodiments the gas pipe 56 can be contained within the boundaries of the vessel 12. For example, the gas pipes 56 may extend through partitions 26 and vapor spaces 40.

FIG. 2 shows an alternate design for the degasser 10. The basic difference between the degassers of FIGS. 1 and 2 lies in the mixers employed in the chambers 18, 20, 22 and 24. Degasser 10 of FIG. 2 includes rotary mixers instead of the eductors 50 employed in the degasser of FIG. 1. The function of the rotary mixers is the same, that is they induce the stripping gas into the liquid and mix the stripping gas with the liquid, causing the undesirable gases contained in the liquid to be displaced and ultimately removed from the vessel 12.

Viewing degasser 10 shown in FIG. 2, it is seen that each chamber is provided with a rotary mixer indicated generally by the numeral 70. Details of the rotary mixer are not dealt with herein because such devices are known and appreciated by those skilled in the art and are not per se material to the present invention. However, a brief discussion of the basic structures of the rotary mixer 70 and how it operates is appropriate. In this regard, rotary mixer 70 includes a rotor indicated generally by the numeral 72 that is submerged in the liquid of one chamber and includes a series of blades. Rotor 72 is driven by a motor and drive assembly indicated generally by the numeral 74. As seen in FIG. 2, a portion of the motor and drive assembly 74 is mounted on the top of vessel 12. Portions of the drive assembly extend downwardly through the respective chambers and are operatively connected to the rotor 72.

Like the FIG. 1 embodiment, there is provided piping for directing stripping gas or gas mixture from the respective vapor spaces 40 into the liquid contained in each of the chambers 18, 20, 22 and 24. This piping includes a gas inlet 76. Extending from each gas inlet 76 is a conduit 78 that is operative to channel stripping gas from the gas inlet 76 to the rotor 72. More particularly, as seen in FIG. 2, conduits 78 extend from the gas inlets 76 through openings in the partitions 26. Conduits 78 also extend horizontally through the vapor spaces 40 and then turn and extend downwardly to the rotors 72. Lower ends of the conduit 78 are provided with gas outlets 78A.

The action of the rotors 72 generates a low pressure area around the gas outlets 78A and this low pressure is present through the conduits 78 to the gas inlets 76. Thus, as the rotors 72 are rotatively driven, this low pressure induces stripping gas from respective vapor spaces into the conduits 78. The induced gas moving through conduits 78 is expelled or dispersed out the outlets 78A in the vicinity of the rotors 72. The action of the rotors 72 and the blades thereof are ineffective to mix the stripping gas with the liquid in the chambers having the rotary mixers 72. As discussed above, this results in the liquid being degassed as the undesirable gas in the liquid is displaced by the stripping gas through the action of the rotary mixers 70.

The general flow of the liquid and the general flow of the stripping gas in the FIG. 2 embodiment is essentially the same as discussed above with respect to FIG. 1. That is, the stripping gas generally moves in a counter-current direction relative to the flow of the liquid through the vessel. Essentially the stripping gas is induced from one vapor space 40 into the liquid in an upstream chamber where the stripping gas is mixed with liquid. This in turn produces more displaced gas and residual stripping gas which rise through the liquid into an upper vapor space after which the residual stripping gas and displaced gas is induced into the liquid in the next upstream chamber. This, as described above, continues until the displaced gas and any residual stripping gas reaches the inlet end of the vessel where it is exhausted from the gas outlet 36.

The degasser 10 in either embodiment can be provided with an optional skim box or floating skimmer 80 which is shown upstream of the respective partitions 26 in the FIG. 2 embodiment. As the mixers induce gas into the liquid, one consequence of the gas-liquid mixing effect is that at the liquid and vapor boundary in the vessel 12, oil and light solids can accumulate. Due to this accumulation effect and the bubbling of gas through the liquid, a foam or froth layer can develop on the liquid surface and this may inhibit gas stripping of the liquid by forming a boundary layer which can prevent gas release from the liquid into the upper vapor space. To mitigate this, the skim box 80 is provided and includes an overflow weir or a floating skimmer can be utilized to remove the foam or froth layer from the liquid by overflowing a portion of the liquid into the skim box or floating skimmer. This foam and liquid can then be removed from the skim box or floating skimmer 80 by a pump or by gravity flow so that it does not interfere with the gas stripping process. The skim box or floating skimmer 80 serves an additional purpose. For oily process waters, it is possible to degas and deoil the water simultaneously within one unit operation. As the foam layer is typically accumulated, oil and light solids are floated by inducing the gas into the liquid. By removing the foam this improves the overall quality of the effluent as gas is stripped from the liquid. degasser Degasser 10 can be employed in a wide range of systems and processes for treating aqueous streams. For example, the degasser 10 can be used with skim tanks, induced gas flotation units, nutshell filters, free water knockout units, contact flotation units and other wastewater treatment systems to remove carbon dioxide, hydrogen sulfide, oxygen, benzene and other undesirable gases. One example of the use of the degasser 10 relates to pre-treating wastewater streams to remove alkalinity. Here an acid is mixed with the wastewater stream which converts alkalinity to carbon dioxide and thereafter the degasser 10 can be employed to remove the carbon dioxide.

Figure 3:
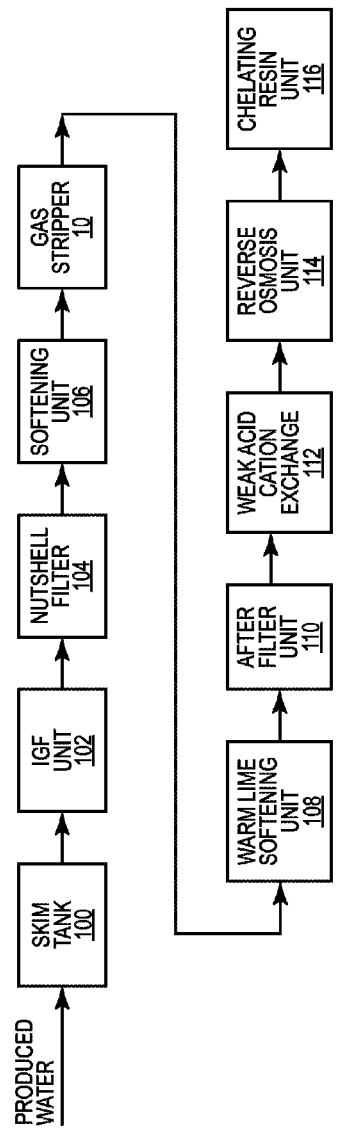
FIG. 3 is an exemplary produced water treatment process utilizing the degasser of the present invention.

Degasser 10 is particularly useful in treating produced water resulting from oil or gas recovery processes. FIG. 3 is a schematic illustration of a produced water treatment process that includes the degasser 10. An oil-water mixture is recovered from an oil-bearing formation. In a conventional process, oil is separated from the oil-water mixture to form produced water. The produced water is directed to a skim tank 100 where oil is skimmed from the surface of the produced water. From the skim tank 100, the produced water is directed to an induced gas flotation (IGF) unit 102. In the induced gas flotation unit 102, suspended solids and free oil are removed. Thereafter, the produced water is directed to and through a nutshell filter 104 for removing additional oil. Some produced water streams include a relatively high concentration of hardness that tends to scale and foul downstream equipment, especially membranes used to remove dissolved solids. From the nutshell filter 104, the produced water is directed to a softening unit for removing hardness, such as calcium carbonate. From the softening unit 106, the produced water is directed to the degasser 10 described above and shown in FIGS. 1 and 2. In many instances, the produced water will include a significant concentration of carbon dioxide and the degasser 10 is effective in removing carbon dioxide, and in some cases other gases, from the produced water. Effluent from the degasser 10 is directed to a warm lime softening unit 108. In a typical process, a coagulant and a flocculant is mixed with the produced water along with lime and a caustic. This will enable additional hardness to be precipitated from the produced water. Also, many produced water streams include silica that has the potential to scale downstream equipment, especially membranes. To precipitate silica, magnesium oxide can be added and mixed with the produced water in the warm lime softening unit 108. Downstream from the warm lime softening unit 108, various filters can be employed for removing additional suspended solids. In the case of the FIG. 3 embodiment, an after filter unit 110 is shown. After filtering the produced water in the after filter unit 110, the produced water is directed to a cation exchange 112. When the cation exchange is operated in the sodium mode, for example, it is effective to remove residual hardness. After being subjected to treatment in the cation exchange 112, the produced water is directed to a reverse osmosis unit 114 that removes a wide range of dissolved solids, including silica and organics as well as a host of other dissolved solids. In the example shown in FIG. 3, the effluent from the reverse osmosis unit 114 is directed to a chelating resin unit 116 for further treatment.

It should be pointed out that the process illustrated in FIG. 3 is an exemplary process for treating produced water that includes the degasser 10 described above. The specifics of a produced water treatment process can vary substantially and therefore the process shown in FIG. 3 is exemplary. For a more complete and unified understanding of produced water processes, one is referred to the disclosure in U.S. Pat. No. 7,815,804, the disclosure of which is expressly incorporated herein by reference.

As discussed above, the liquid and the stripping gas flow in counter-directions through the vessel 12. There are benefits to this approach to stripping dissolved gas from the liquid. For example, in the first chamber 18 a relatively large quantity of gas is removed from the liquid due to the pressure drop that occurs in the vessel 12. Thus, relatively little stripping gas is required in the first chamber 18 and this is why the stripping gas present in the first chamber 18 is still effective, even though its purity has been decreased. As the liquid flows from the first chamber 18 to other downstream chambers, more stripping gas is required to drive the dissolved gas out of the downstream flowing liquid. Once the liquid reaches the discharge chamber 32, polishing takes place in the presence of high purity stripping gas. This approach assures the effective use of the stripping gas and also results in the substantial reduction of dissolved gas in the liquid effluent leaving the vessel 12.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of removing gas from a liquid flowing through a series of chambers in a vessel and wherein a series of vapor spaces are defined in the chambers above the liquid, the method comprising:
   directing the liquid into a liquid inlet of a vessel and flowing the liquid through the series of chambers formed in the vessel;
   directing a motive liquid into one or more eductors associated with the vessel;
   wherein the motive liquid directed into the one or more eductors induces a stripping gas into the one or more eductors;
   mixing the motive liquid with the stripping gas in the one or more eductors to form a motive liquid-stripping gas mixture;
   wherein the one or more eductors injects the motive liquid-stripping gas mixture into the liquid flowing through the chambers of the vessel and mixes the motive liquid-stripping gas with the liquid flowing through the chambers;
   displacing the gas from the liquid flowing through the chambers and wherein the gas displaced from the liquid flowing through the chambers mixes with the stripping gas to form a gas mixture;
   wherein the gas mixture rises into the vapor spaces in the chambers;
   wherein the vapor spaces in the chambers are in fluid communication;
   inducing the gas mixture to flow upstream through the series of vapor spaces such that in the process the gas mixture flows from one downstream vapor space to another upstream vapor space;
   after the gas mixture has moved upstream and through the series of vapor spaces, discharging the gas mixture from the vessel; and
   after the gas has been removed from the liquid, discharging degassed liquid from the vessel.

2. The method of claim 1 including directing the motive liquid-stripping gas mixture down a series of conduits disposed in the vessel and which extend into the liquid flowing through the chambers and emitting the motive liquid-stripping gas mixture from a lower end of the conduits into the liquid flowing through the chambers.

3. The method of claim 1 wherein at least one of the one or more eductors includes a motive liquid inlet, a stripping gas inlet, and a main conduit that extends into the liquid in one chamber and wherein the method includes:
    injecting the motive liquid into the motive liquid inlet;
    inducing the stripping gas into the stripping gas inlet; and
    directing the motive liquid-stripping gas mixture downwardly through the main conduit into the liquid flowing through the chambers where the motive liquid-stripping gas mixture exits the main conduit and mixes with the liquid flowing through the chambers.

4. A method of removing gas from a liquid flowing through a series of chambers in a vessel and wherein a series of vapor spaces are defined in the chambers above the liquid, the method comprising:
    directing the liquid into a liquid inlet of a vessel and flowing the liquid through the series of chambers formed in the vessel;
    directing a motive liquid into one or more eductors associated with the vessel;
    wherein the motive liquid directed into the one or more eductors induces a stripping gas into the one or more eductors;
    mixing the motive liquid with the stripping gas in the one or more eductors to form a motive liquid-stripping gas mixture;
    wherein the one or more eductors injects the motive liquid-stripping gas mixture into the liquid flowing through the chambers of the vessel and mixes the motive liquid-stripping gas with the liquid flowing through the chambers;
    displacing the gas from the liquid flowing through the chambers and wherein the gas displaced from the liquid flowing through the chambers mixes with the stripping gas to form a gas mixture;
    wherein the gas mixture rises into the vapor spaces in the chambers;
    wherein the vapor spaces in the chambers are in fluid communication;
    inducing the gas mixture to flow upstream through the series of vapor spaces such that in the process the gas mixture flows from one downstream vapor space to another upstream vapor space;
    after the gas mixture has moved upstream and through the series of vapor spaces, discharging the gas mixture from the vessel;
    after the gas has been removed from the liquid, discharging degassed liquid from the vessel; and
    wherein the motive liquid comprises at least a portion of the degassed liquid discharged from the vessel and wherein the method includes pumping at least a portion of the degassed liquid into the one or more eductors which induces said stripping gas into the one or more eductors.

5. The method of claim 4 including directing the motive liquid-stripping gas mixture down a series of conduits disposed in the vessel and which extend into the liquid flowing through the chambers and emitting the motive liquid-stripping gas mixture from a lower end of the conduits into the liquid flowing through the chambers.

6. The method of claim 4 wherein at least one of the one or more eductors includes a motive liquid inlet, a stripping gas inlet, and a main conduit that extends into the liquid in one chamber and wherein the method includes:
    Pumping the degassed liquid into the motive liquid inlet;
    inducing the stripping gas into the stripping gas inlet; and
    directing the motive liquid-stripping gas mixture downwardly through the main conduit into the liquid flowing through the chambers where the motive liquid-stripping gas mixture exits the main conduit a nd mixes with the liquid flowing through the chambers.

\* \* \* \* \*